127,141

UNITED STATES PATENT OFFICE.

JOSEPH G. BARKER, OF WATERTOWN, MASSACHUSETTS.

IMPROVEMENT IN COMPOUNDS FOR DESTROYING INSECTS.

Specification forming part of Letters Patent No. 127,141, dated May 28, 1872.

SPECIFICATION.

I, JOSEPH G. BARKER, of Watertown, in the county of Middlesex and State of Massachusetts, have invented a new and useful Compound for Destroying Currant Worms, Potato Bugs, and Insects on Vines and Shrubs, of which the following is a description and specification:

The nature of the invention consists in mixing lime and the nitrate of potassa in certain proportions and under certain conditions for the said mentioned purposes.

To prepare the compound the lime is slaked and reduced to a fine powder; the nitrate of potassa is also reduced to a powder, and the two are mixed in the proportions of ten parts of lime to one part of nitrate of potassa. These proportions, however, are not absolute, but have been found to be most effectual, beneficial, and economical.

When the mixture is prepared it is applied by a dredging-box, fine sieve, or like vessel, sifting the compound upon the leaves of the currant bush, vines, &c.; and to be effectual the application should be made when the dew is upon the shrub or vine or after a shower.

The nitrate of potassa being soluble in water, the lime holds the nitrate, and a film of paste is formed or lodged upon the leaf. The nitrate is a deadly poison to insects, and lime, also, acting separately and in conjunction with the nitrate, serves to drive them away.

A single application will be effectual. This compound will not injure the plant, but serves as a good fertilizer; neither will it injure the fruit, or render it unfit for use, even when ripe, like most compounds used for this purpose. It is inexpensive and of great practical utility.

What I claim as my invention, and desire to secure by Letters Patent, is—

The above compound, prepared of the materials and in the manner specified, to be used for the destruction of currant worms, potato bugs, &c., as described.

JOSEPH G. BARKER.

Witnesses:
J. L. NEWTON,
E. J. BARKER.